US006615128B1

(12) United States Patent
Hellmich

(10) Patent No.: US 6,615,128 B1
(45) Date of Patent: Sep. 2, 2003

(54) METHOD FOR ELECTRONICALLY TRIMMING FOR AN INJECTION APPARATUS

(75) Inventor: Wolfram Hellmich, München (DE)

(73) Assignee: Bombardier Motor Corporation of America, Grant, FL (US)

( * ) Notice: Subject to any disclaimer, the term of this patent is extended or adjusted under 35 U.S.C. 154(b) by 0 days.

(21) Appl. No.: 09/806,061

(22) PCT Filed: Oct. 20, 1998

(86) PCT No.: PCT/EP98/06644

§ 371 (c)(1),
(2), (4) Date: Mar. 23, 2001

(87) PCT Pub. No.: WO00/20755

PCT Pub. Date: Apr. 13, 2000

(65) Prior Publication Data

(65)

(30) Foreign Application Priority Data

Oct. 2, 1998 (DE) ........................................ 198 45 441

(51) Int. Cl.[7] .......................... G06F 19/00; F02D 41/24
(52) U.S. Cl. ........................ 701/104; 701/102; 701/103
(58) Field of Search ................................ 701/104, 101, 701/103, 102, 106, 115; 123/478, 480, 497, 482

(56) References Cited

U.S. PATENT DOCUMENTS 5,505,180 A * 4/1996 Otterman et al. ........... 123/497
5,927,253 A * 7/1999 Oyafuso et al. ............ 123/497
5,946,911 A * 9/1999 Buschur et al. ............... 60/424
6,148,809 A * 11/2000 Cinquegrani ................ 123/497
6,158,416 A * 12/2000 Chen et al. ................. 123/380
6,512,974 B2 * 1/2003 Houston et al. ............ 701/115

FOREIGN PATENT DOCUMENTS

EP 0624 722 B1 * 3/1997 .......... F02D/41/32

* cited by examiner

*Primary Examiner*—Hieu T. Vo
(74) *Attorney, Agent, or Firm*—Ziolkowski Patent Solutions Group, LLC

(57) ABSTRACT

A method for electronic trimming of at least one fluid injection pump, in which a control signal which is corrected for injection pump operation and, preferably, a control signal which is corrected for engine operation as well are determined by a control module of an electronic control device and are used for operation of the fluid injection pump, and in which, furthermore, a fluid injection pump is used which operates on the energy storage principle and whose feed characteristic follows an at least third-order polynomial identically or at least largely approximately and the parameters are determined in predetermined standard conditions for an at least third-order standard polynomial, are stored and are used in the determination of the required fuel injection quantity.

18 Claims, 3 Drawing Sheets

METHOD FOR ELECTRONICALLY TRIMMING FOR AN INJECTION APPARATUS

The invention relates to a method for electronically minimizing to eliminating rated output deviations (trimming) of a fluid injection apparatus, in particular of a fuel injection apparatus, primarily a fuel injection apparatus having a plurality of injection pumps for an internal combustion engine.

For operation of a fuel injection apparatus for an internal combustion engine, it is known for a control signal to be produced which causes an injection pump to inject into an engine cylinder, at a specific time, within a specific time period and as accurately as possible, that amount of fuel which the engine needs in order to produce a demanded, predetermined output power.

The control signal is calculated and produced in an electronic control module and is passed on to the electronic and/or electrical devices in the injection apparatus or in the injection pump where it initiates and brings about the spraying of, for example, fuel corresponding to the control signal.

The production of the control signal is complex and generally includes a particular control strategy. A large number of influencing variables are taken into account which are, for example, related to engine operation, related to the engine environment, related to the type of fuel, and/or related to the fuel state. Data for these influencing variables are generally determined by means of sensors, and are supplied to the control module. For example, the engine speed, the crankshaft position, the engine coolant temperature, the engine exhaust gas pressure, the throttle valve position, the external temperature, the air pressure or the like are detected at a specific time, are supplied to the control module, and are processed or calculated in the form of data in the control module. The calculation produces a factor by which a control signal is multiplied, said control signal being stored in the control module for the engine, corresponding to the rated output of the engine, and being proportional to the quantity.

It is also known that, for example, the design, operating state and operating conditions of the injection pumps have a considerable influence on the time and the duration of the spraying process, with, in particular, even injection pumps of an identical type producing different performance and having a different injection behaviour.

Known solutions for this problem are described in DE 195 20 037 A1 which indicates, as a further new solution, the possibility of defining the spraying characteristic of each injection pump individually by measuring the spraying behavior in a large number of operating conditions and operating states, and adapting the control signal on the basis of the measured data.

To define this idea more specifically, the individual injection pumps are subdivided into specific trimming categories with similar discrepancies and a trimming factor for the control signal is defined for each category.

However, it has been found that categorized trimming factors defined in such a way do not sufficiently reduce discrepancies tom the rated output caused by the injection pump.

When designing injection pumps, the aims include, for example, selection of the size and nature of the components and the physical form in such a way that the injection pump has a linear spraying behavior for different spraying rates and spraying times which correspond to the various rated outputs of an engine, so that the respective control signal matching factor can easily be determined. Small required fuel quantities are sprayed for a correspondingly shorter time period, and larger or large amounts are sprayed for a correspondingly longer or long time duration, and the spraying amounts/spray duration ratio should correspond to a straight line on a graph.

This aim to linearize the flow characteristic generally requires debating of the components and/or use of relatively expensive functional parts. Furthermore, the derated type requires considerably more electrical operating power.

The object of the invention is to provide a method for electronic trimming of an injection apparatus which allows more accurate matching of the control signal, based on the injection pump, to the sprayed rated output initiated by the control signal, without any complex design measures relating to the injection pump.

This object is achieved by the features of claim 1. Advantageous developments of the invention are described in the dependant claims.

The essential feature is the selection of the injection pump type. An electromagnetically operated injection pump is used, which operates on the energy storage principle and is described, for example, in WO 92/14925 and WO 93/18297.

By virtue of the system, such injection pumps operate fundamentally non-linearly, for which reason their selection is not directly obvious. Although it is not impossible to ensure a linear spray characteristic by design measures, the disadvantageous measures described above would, however, be required to a particularly pronounced extent in comparison to other injection pump types.

The injection pumps used according to the invention, which are also referred to as energy storage injection pumps in the following text, can be physically set up in such a way that their injection characteristic follows an at least third-order curve as accurately as possible. The spraying characteristic of most known energy storage injection pumps approximately follows per se a third or higher order curve by virtue of the system and the design, so that these pumps do not require any physical change. In cases in which a physical change should be carried out, it is generally sufficient, for example, to lengthen or to shorten the acceleration path of the armature of the pump for storage of kinetic energy, and/or to adapt the saturation behaviour of the electromagnet of the electromagnetic drive in the injection pump. These measures are so simple and involve an effort which is so minor that they are virtually insignificant. These measures also assist the capability to use the full performance potential of the pumps and thus their efficiency both with regard to the feed performance and with regard to the production cost for the respective application.

For the purposes of the method according to the invention, the spraying characteristic of each individual fabricated injection pump is defined in normal conditions (for example at 20° C. and normal atmospheric pressure), with a sufficient number of measured values being determined and processed for the flow curve or feed characteristic, for example in the form of a signal duration/spraying quantity graph. The measured values are used to calculate the finction which corresponds to the third or higher order curve which can be established from the measured values. The function for the third-order curve which, as is known, is in general form given by: $Y=A+B_1X+B_2X^2+B_3X^3$, includes the parameters A, $B_1$, $B_2$, $B_3$ with which the individual third-order curve for the injection pump covered individually by the parameters is uniquely defined. In this case, Y is the control signal duration to be determined and X is the quantity of fluid to be sprayed out.

The four parameters are stored electronically and, if required, are linked, for example, to a serial number for the injection pump, are electronically controlled and represent the exact mathematical description of any point on the feed characteristic of this individual injection pump. The electronic control module of the electronic control system uses these parameters where necessary and calculates the switched-on duration signal required for this individual pump to achieve the respectively required injection amount exactly.

The four parameters are expediently marked in a manner known per se on or with the injection pump such that they can be recorded, and accompany the injection pump until it is used, and during its use.

The measurement of the feed profile for the injection pump is expediently restricted to a limited number of individual measurements, for time reasons. However, each individual measurement can be carried out only with a finite accuracy, which moans that the measurement points are scattered around the actual curve profile depending on the discrepancy tolerance of the instrument. A mathematically carried out determination of the polynomial profile not only interpolates between the measurement errors and reduces their magnitude, but automatically also leads to non-linear interpolation between the individual measurement points. According to the invention, this guarantees maximum achievable precision with minimum effort in the reproduction of the injection amount by means of an electrical signal duration.

When injection pumps are being fitted, for example to an engine, the parameters of each injection pump are transferred to a memory in the electronic controller, and are associated with the respective injection pump.

As normal, the engine is driven from a family of characteristics in which the fuel quantity to be injected and/or an engine-specific correction value proportional to it are/is stored as a function of the engine speed, load and a number of other normally used variables relating to engine operation. In order to achieve the respective, programmed rated injection quantity more precisely, the controller processor also calculates, in particular, an electrical drive signal Y, which is required for the relevant injection pump, for system-specific trimming, before each injection process. To this end, the desired fuel quantity X is calculated using the equation $Y=A+B_1X+B_2X^2+B_3X^3$, as well as the numerical values for the parameters A, $B_1$, $B_2$ and $B_3$ for the appropriate injection pump.

An alternative method is provided according to the invention, in order to keep the required processor computation rate low. In this case, the feed characteristics are recalculated once whenever the engine is started, and are stored digitally in a volatile memory. The processor uses far less power to read stored data than to carry out complex computation operations. Even if a high memory capacity is selected for very finely resolved characteristics, the overall costs for this method can be kept lower, since the processor is simpler.

As already described above, an electronic engine controller normally also identifies changing environmental influences relevant to engine operation, such as the temperature and pressure of the induced air, and adapts the injection quantity to these conditions during the engine-specific correction process. Normally, the corrections are carried out on the basis of factors as a percentage change to the control variables entered in the family of characteristics, before these control variables are passed on to the injection pump system. For those influences which act directly on the engine and its operating process, the stored injection quantities and the variables proportional to them are thus multiplied by an appropriate factor greater or less than unity, in order to match them to the existing environmental conditions.

By using an energy storage injection pump, whose feed characteristic in normal conditions follows an at least third-order curve or at least approximately follows a third or higher order curve, it is surprisingly also possible to take into account a number of significant changing influences on the injection pump or on an injection system equipped with a number of injection pumps which influence the feed quantity of the injection pump, very accurately and without any particular effort, by correction of the control signal (system-specific trimming). Such influences are, for example, different fuel temperatures, different temperatures at the injection nozzle, different battery voltages, and different driver output signals.

Surprisingly, it was possible to confirm that most relevant influences cause only a shift in the normal feed characteristic corresponding to a third or higher order curve, without the individual shape of the characteristic itself being changed. The respective shift, caused by a relevant influence, in the feed characteristic has a two-dimensional profile, namely in the X and Y directions, which means that a conventional correction with only one factor is impossible. In fact, this system-specific trimming according to the invention is carried out with two computed values per type of influence, which surprisingly results in high trimming accuracy.

According to the invention, as when determining the standard feed characteristic in normal conditions, feed characteristics are determined by measuring, for example, the feed quantity for a number of specific different states of one type of influence and, for example, defining the four parameters of the respective corresponding third-order curve. A factor is thus mathematically defined for each parameter, which describes its individual change in the various states of the relevant type of influence. These factors are stored and made available to the control module in the same way. For example, in this context, feed characteristics and their parameters corresponding to a third-order curve are determined for specific different temperatures (states) of the nozzle temperature (type of influence), specific different voltages (states) of the supply voltage (type of influence), specific different current profiles (states) of the driver output signals (type of influence), specific different temperatures (states) of the fuel temperature (type of influence), and specific different density values (states) of the fuel density (type of influence).

According to a simplified embodiment of the method according to the invention, $\Delta X$ and $\Delta Y$ values are defined and stored instead of the polynomial or curve parameters for the shifts of the feed characteristic for specific different states of a type of influence, and are made available to the control module. This procedure considerably reduces the amount of stored data and the computation power to be provided.

In both cases, a computation operation in the control module is envisaged which carries out a corresponding linear interpolation for intermediate states between either the parameters, if these are stored, or between the stored $\Delta X$ and $\Delta Y$ values in the situation where $\Delta X$ or $\Delta Y$ values are stored.

The selection of a third or higher order curve according to the invention for the feed characteristic of an injection pump surprisingly results in most influencing variables or types of influence once again behaving like an X-Y-shifted third or higher order curve. Although the linearization for standard characteristic lines can be achieved for linearized injection elements, the various types of influence in fact mean that there is no parallel shift or any other easily recordable shift in the straight lines; in fact, they have different types of curve shapes so that their recording and use involves a very large amount of electronic complexity for correction values.

According to a further particular embodiment of the invention, a computation operation for control signal formation is used when stored ΔX and ΔY values are used, according to which operation the corresponding point of the feed characteristic (normal polynomial or normal characteristic) in normal conditions, for example third order, for the injection pump is first of all defined for the control signal value (engine-specific correction) which is relevant for engine operation, takes account of environmental influences and is proportional to the fuel quantity, and the ΔX value is then associated with the individualized injection pump trimming correction, corresponding to a previously defined state of a type of influence, by addition or subtraction. The control signal value X obtained in this way is used by the control module to calculate the Y value of the third-order polynomial, which is shifted by the value ΔX. This is used to assign the ΔX value by addition or subtraction, resulting in a point which lies on a third-order correction polynomial which is shifted in a corresponding manner in two dimensions but whose profile is the same, with a signal duration being obtained from this point which is necessary for the required injection quantity of the individualized injection pump in the relevant state of the type of influence.

This state-corrected signal duration is determined by the operation which can be carried out most easily and quickly by microprocessors, namely the addition or subtraction of two values. Any desired type of influence for correction may be chosen, with the respective correction being equally simple. A correspondingly large number of assignments can be carried out simultaneously, corresponding to the number of influencing variables to be corrected.

The invention also expediently provides for correction of the tolerances which are necessarily involved in the production of the electrical power output stage. Although this is not a variable which varies when the environmental conditions change; its influence on the feed characteristic does, however, also have a two-dimentionally shifting effect on the standard polynomial—as was found in a surprising manner—and can thus likewise be corrected, as described above, by a pair of ΔX and ΔY values.

The procedure for determining and storing this correction parameter is as follows:

After completion of manufacture, every engine controller is subjected to an electrical functional test, in which dummy loads are connected to the output channels instead of the injection pumps. The current rise curve of an individual current pulse is recorded on each channel, and the integral underneath it is formed mathematically. This integral corresponds to the electrical work carried out. If the measured integral value differs from a predetermined nominal value, then an appropriate addition or subtraction value pair is chosen, is assigned to the relevant output channel, and is stored in the controller. Each output channel is thus given the correction or its characteristic lack or excess of clerical work, irrespective of which injection element is subsequently driven.

The quantity of fuel fed in a unit time is, inter alia, a result of the pressure difference between the pressure within the nozzle of the injection pump and outside it, taking into account the flow resistance of the nozzle. This means that, particularly in the case of direct injection into the combustion chamber of an internal combustion engine, the quantity of fuel fed is dependant on the back pressure and the position of the engine piston before top dead center at the time of injection. This relationship is particularly strong when, as is the case with the energy storage injection pumps selected according to the invention, the feed power is based on a force relationship between the magnetic force on the pump piston and all the forces opposing it. Thus, according to the invention, the pressure in the combustion chamber must also be compensated for for well-controllable direct injection.

With the injection pumps used according to the invention, it has been found that, with different back pressures and with an increase in back pressure, the feed characteristic is distorted toward lower feed quantities, with a simultaneous shift toward longer control signal time values. This effect can be described mathematically by multiplication of the abscissa value by a corresponding factor, and addition to the ordinate value. In this case, surprisingly, it is once again unnecessary to change the parameter values for the injection pump recorded in the standard state. The multiplication of the abscissa value is completed by the polynomial calculation, with the addition on the ordinate being carried out afterwards.

If the application of the injection system relates to a direct-injection engine, then, generally, the design relates to unthrottled operation, or at least to operation with little throttling at partial load. One advantage of unthrottled engines, or engines with little throttling, is that the mixture formation is very largely independent of environmental influences during partial load operation. The control method according to the invention thus envisages a programmable threshold value in the engine family of characteristics, beyond which the fuel quantity is no longer corrected for air temperature and air pressure. In order to achieve a smooth transition between the corrected and the uncorrected area of the family of characteristics, the correction values are interpolated to zero. This interpolation starts from a further programmable threshold value, which is above the former.

The method according to the invention can be seen, by way of example, from the drawing, in which.

Figure 1:
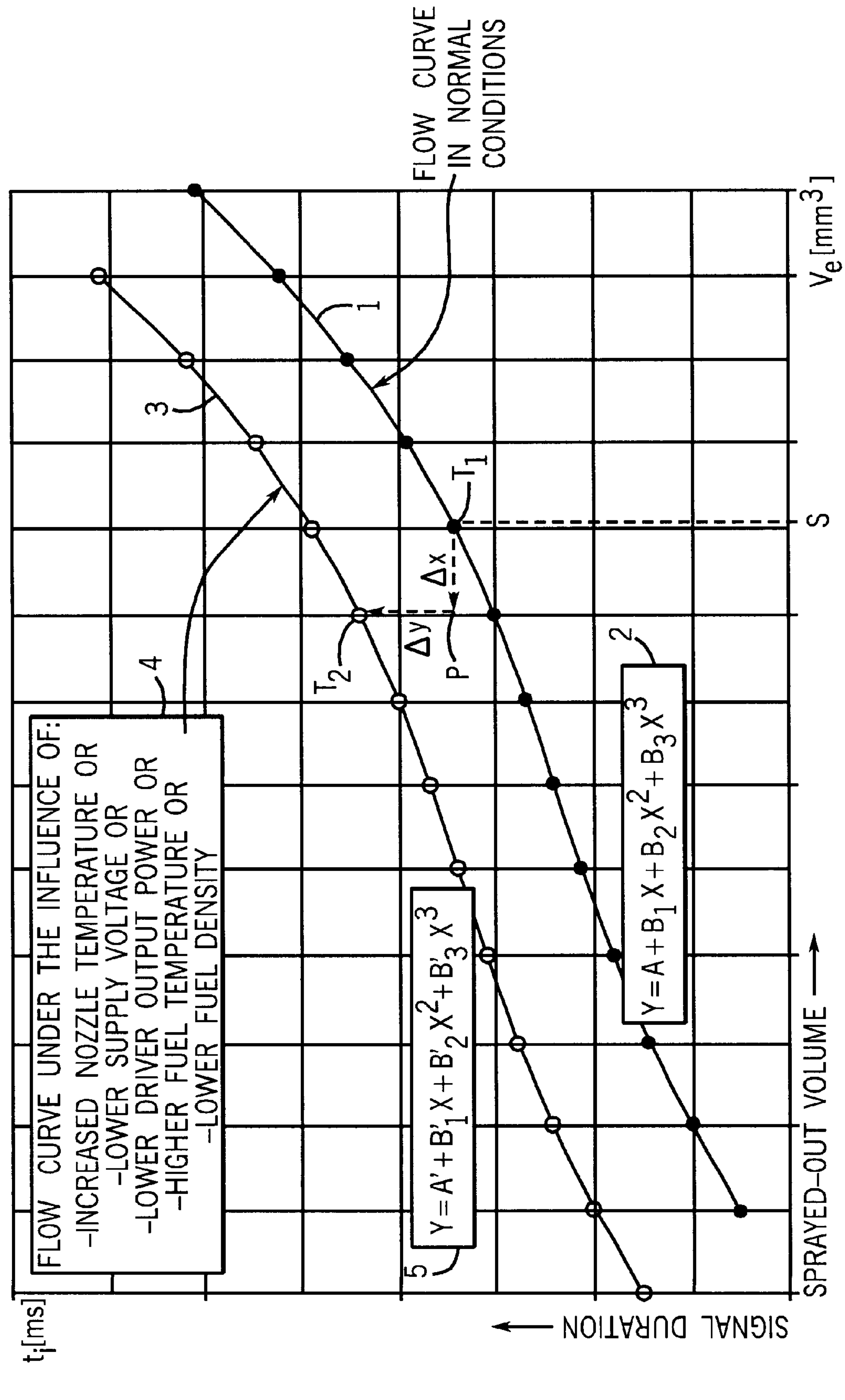
FIG. 1 shows a signal duration/injection quantity graph with feed characteristics for a specific injection pump.

In FIG. 1, the injection quantity $V_c$ is plotted on the abscissa, and the signal duration $t_i$ on the ordinate. The graph shows a standard feed characteristic 1 as a third-order curve, whose parameters are indicated in box 2 (flow curve in normal conditions). Above the curve 1, there is a correction curve 3 with the same shape but with a ΔX/ΔY shift. The third-order curve 3 is a flow curve or feed characteristic for the injection pump for a specific state of a specific type of influence, with possible types of influence being listed, by way of example, in box 4. For the correction according to the invention, the $V_c$ value S is assumed which is corrected for engine operation and is proportional to the fuel quantity, and is obtained on the basis of a nominal value from the engine-specific correction. The correction value ΔX for the injection pump operation correction is added to the point $T_1$ which lies on the standard polynomial 1 and is associated with the $V_c$ value S. The corresponding ΔX-shifted third-order polynomial is calculated by the control module for the coordinates of the point P resulting from this on the graph. The correction value ΔY is then added to the injection pump operation correction, and a point $T_2$ is determined which lies on the state-related X/Y-shifted third-order polynomial 3 whose parameters are listed in box 5. The point $T_2$, which lies on the polynomial 3, represents a corresponding state-related corrected time duration of $t_i$ in ms for spraying out the required quantity of fuel.

Figure 2:
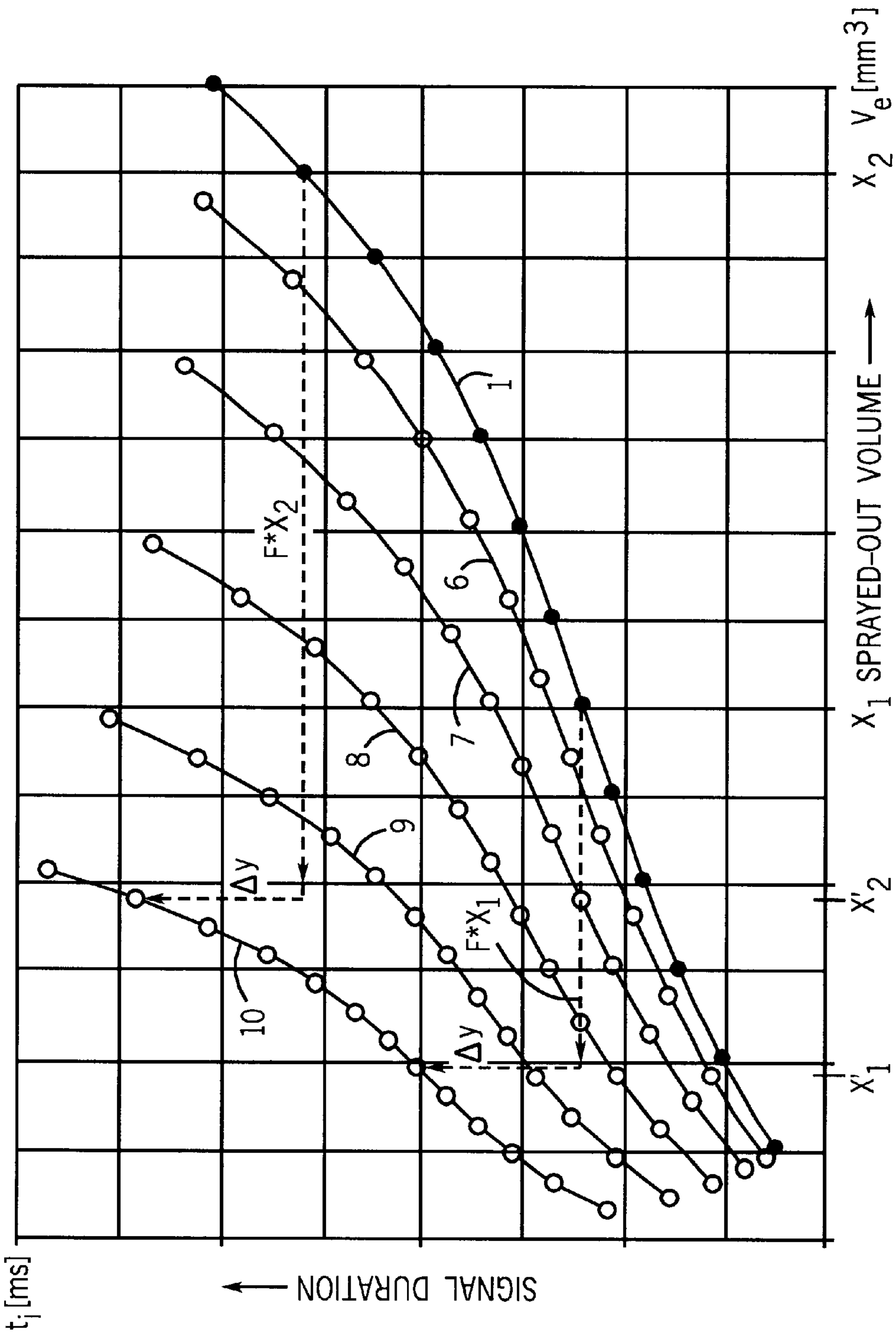
FIG. 2 shows a signal duration/injection quantity graph with feed characteristics for a specific injection pump, for various back pressures.

FIG. 2 shows the influence of a back pressure in the characteristic graph. Based on the standard third-order polynomial 1, recorded with atmospheric back pressure, the third-order polynomials 6 to 10 are defined for correspondingly higher back pressures. Distortion levels are obtained from the position of these polynomials, which can be recorded mathematically exactly with respect to the standard polynomial 1 by means of F*X and ΔY values. The F*X and ΔY values are used to carry out an appropriate back-pressure correction which, once again, in each case requires only one multiplication and one addition or subtraction.

The described invention is not limited to the cited examples. Further types of influence can be defined which give third or higher order polynomials shifted from the standard polynomial, or correspondingly distorted third or higher order polynomials. The invention can also be used if only approximately third or higher order polynomials are obtained, since the described simple correction method can then still be used Polynomials of orders higher than three are used whenever the measured values for the standard polynomial do not follow a third-order curve sufficiently accurately. It has been found that, in this case, the measured values generally correspond to a higher-order curve. In any case, for the purposes of the invention, it is possible to determine that higher-order curve which corresponds most accurately to the measured values. A third-order curve is preferably defined since fewer parameters need be defined and stored compared with higher-order curves.

Figure 3:
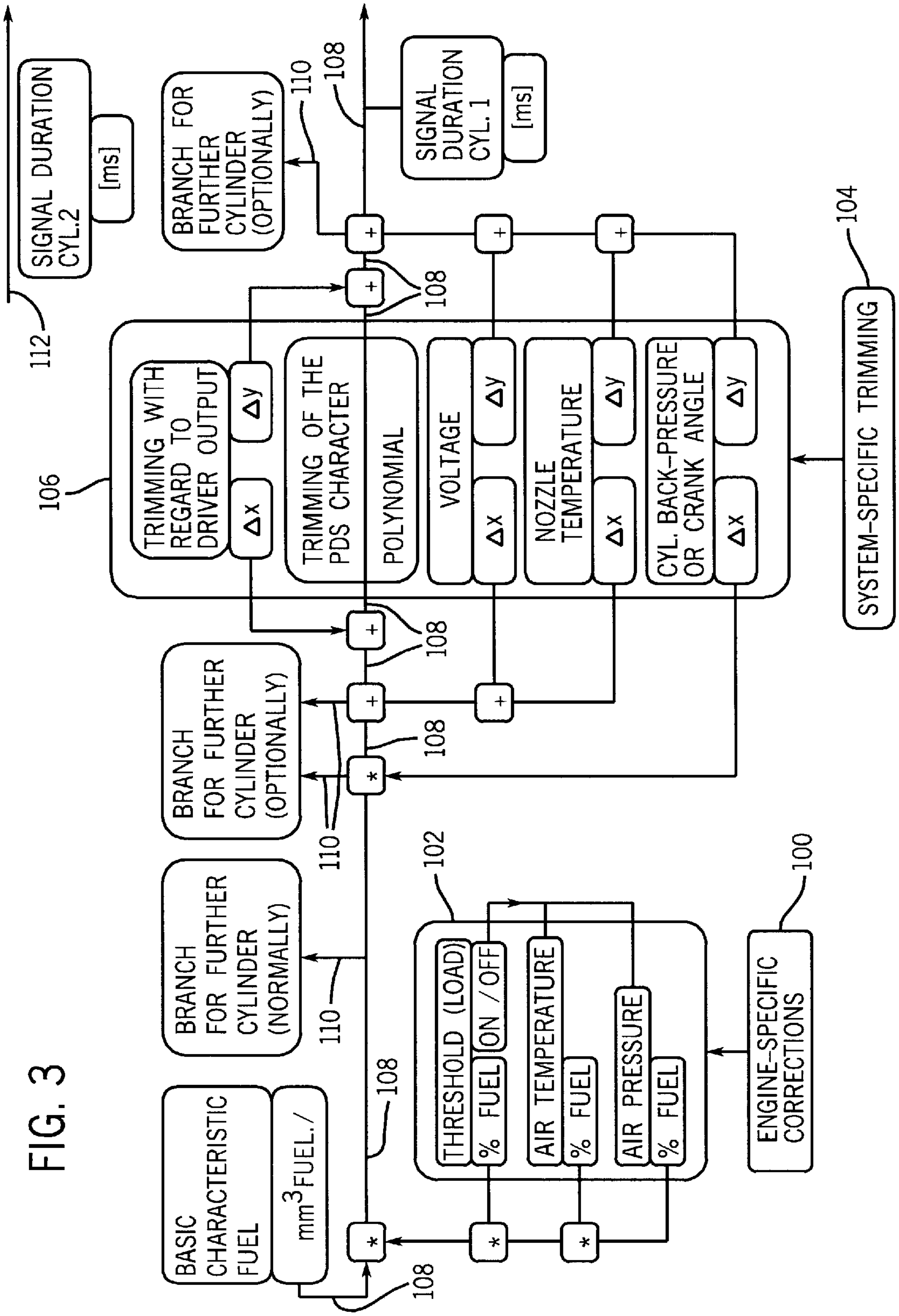
FIG. 3 shows, schematically, a control strategy operating in accordance with the method according to the invention.

FIG. 3 shows the control strategy based on the method according to the invention. The boxed areas with the asterisk represent a multiplication, and the boxed areas with the +− sign represent an addition or subtraction. On the left-hand side of FIG. 3, it can be seen that the basic family of characteristics for fuel gives a signal value which is proportional to the fuel quantity and is multiplied by signal values for engine-specific correction. The engine-specific correction 100 —as is evident from the area 102 and the lined areas contained in it—takes account, for example, of a threshold load, the air temperature and the air pressure in the normal way.

The system-specific trimming 104 for an injection pump is shown on the right-hand side of FIG. 3. The area 106 shows types of influence in lined areas on the basis of which the polynomial is corrected. The position of the asterisk area and the position of the +− areas in FIG. 3 with regard to the signal duration cylinder-1 line 108 indicate when each correction for trimming is carried out. For example, with regard to "cylinder back pressure" as a type of influence, it can be seen that the multiplication is carded out first, and the ΔY value is not added or subtracted until after the polynomial calculation.

Vertical, arrow lines 110 indicate that the corresponding values can also be used for other cylinders 112, with an appropriate precondition.

The control strategy shown in FIG. 3 can, of course, also use a different sequence of addition and subtraction with regard to the types of influence, but the essential feature is that the process is based on a signal value which is proportional to fuel quantity and already includes the engine-specific corrections.

What is claimed is:

1. An apparatus for electronically trimming a fluid injection pump of an interal combustion engine, the apparatus comprising:

a fluid injection pump having a feed characteristic that at least substantially follows an at least third-order polynomial; and an electronic control module, wherein the electronic control module determines parameters of a control signal for a type of influence.

2. The apparatus of claim 1 wherein the electronic control module is further configured to determine at least one X-Y-shifted at least third-order correction polynomial having the same form of the at least third-order polynomial with a specific type of influence on the fluid injection pump and store parameters of the at least one X-Y-shifted at least third-order correction polynomial.

3. The apparatus of claim 1 wherein the electronic control module is further configured to define and store ΔX and ΔY values for specific different states of a type of influence instead of polynomial parameters.

4. The apparatus of claim 1 wherein a corrected control signal is determined by assigning one control value for the type of influence by multiplication and by assigning another control value for the type of influence by addition or subtraction to the control signal.

5. The apparatus of claim 4 wherein the control module is further configured to determine a time duration control signal for a corrected control signal.

6. The apparatus of claim 5 wherein the time duration control signal is used for operation of the fluid injection pump.

7. The apparatus of claim 1 wherein the electronic control module is further configured to determine a standard feed characteristic in normal operating conditions by measuring a feed rate for a number of specific different states of the type of influence and by defining parameter of a curve corresponding to the different states.

8. The apparatus of claim 1 wherein the electronic control module is further configured to determine a corresponding linear interpolation for intermediate states between either parameters, if these are stored, or between stored ΔX and a ΔY values in the situation where ΔX and a ΔY values are stored.

9. A method for electronic trimming of at least one fluid injection pump, comprising the steps of:

a) operating a fluid injection pump having a feed characteristic that at least substantially follows an at least third-order polynomial;

b) and wherein parameters are determined in predetermined standard conditions for an at least third-order standard polynomial, and are stored and used in a determination of a required fuel injection quantity.

10. The method as claimed in claim 1, further comprising:

determining at least one X-Y shifted at least third-order correction polynomial having the same form of the at least third-order polynomial with a specific type of influence on the fluid injection pump; and storing parameters of the at least one X-Y shifted at least third-order correction polynomial.

11. The method as claimed in claim 1, further comprising:

determining a corrected control signal, which is corrected for engine operation and is proportional to fluid quantity, a normal manner by a control module; and assigning at least two control values for a type of influence by addition or subtraction to the corrected control signal, which control values are determined by the control module from the parameter of a standard polynomial and of a correction polynomial, from which the corrected control signal, which is proportional to the fluid quantity, results.

12. The method as claimed in claim 1, further comprising:

assigning one control value for a type of influence by multiplication; and assigning a further control value for the type of influence by addition or subtraction to a corrected control signal, which is corrected for engine operation and is proportional to the fluid quantity, wherein the control values are determined by a control module from the parameters of a standard polynomial and of a correction polynomial.

13. The method as claimed in claim 12, further comprising determining a time duration control signal for the corrected control signal.

14. The method as claimed in claim 13, wherein the time duration control signal is used for operation of the fluid injection pump.

15. The method as claimed in claim 1, further comprising:

producing a control signal ΔX and ΔY values for a types of influence.

16. The method as claimed in claim 1, further comprising:

determining a standard feed characteristic in normal operating conditions, by;

measuring a feed rate for a number of specific different states of a type of influence, and defining parameters of a curve, corresponding to the different states.

17. The method as claimed in claim 1, wherein ΔX and ΔY values for specific different states of a type of influence are defined and stored instead of the polynomial parameters.

18. The method as claimed in claim 1, further comprising:

computing a corresponding linear interpolation for intermediate states between either the parameters, if these are stored, or between stored ΔX and ΔY values in a situation where ΔX or ΔY values are stored.

* * * * *

UNITED STATES PATENT AND TRADEMARK OFFICE

CERTIFICATE OF CORRECTION

PATENT NO. : 6,615,128 B1

DATED : September 2, 2003

INVENTOR(S) : Wolfram Hellmich

It is certified that error appears in the above-identified patent and that said Letters Patent is hereby corrected as shown below:

<u>Column 2,</u>
Line 9, delete "debating" and substitute therefor -- derating --;

<u>Column 6,</u>
Lines 61 and 67, delete "$V_c$" and substitute therefor -- $V_e$ --;

<u>Column 7,</u>
Line 59, delete "carded" and substitute therefor -- carried --;

<u>Column 10,</u>
Line 2, delete "types" and substitute therefor -- type --.

Signed and Sealed this

Twenty-first Day of October, 2003

JAMES E. ROGAN

*Director of the United States Patent and Trademark Office*